Patented Dec. 16, 1941

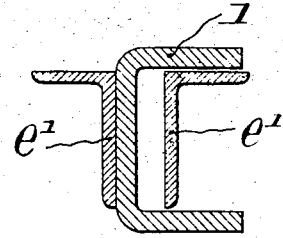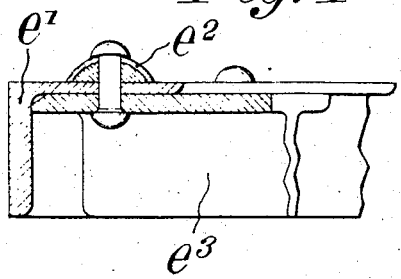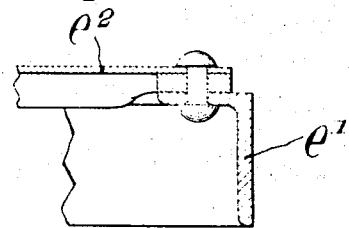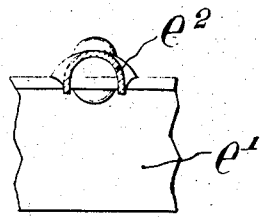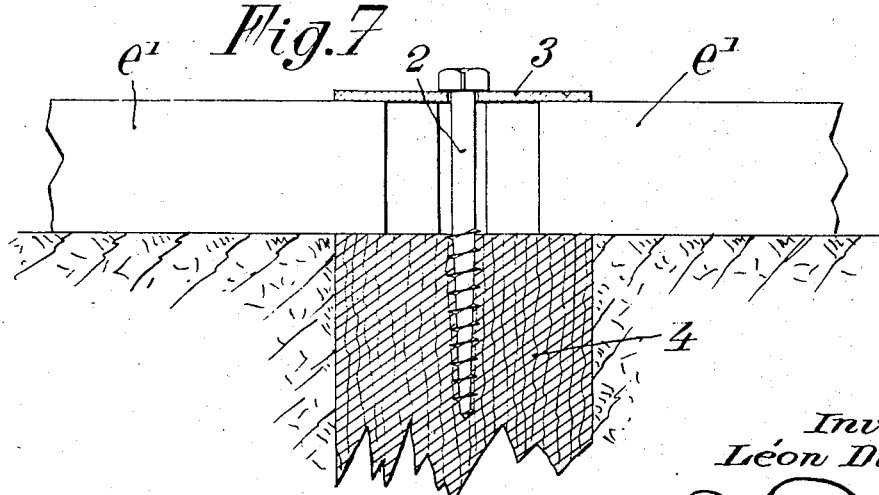

2,266,178

UNITED STATES PATENT OFFICE 2,266,178

SYSTEM FOR CONSTITUTING A ROLLING TRACK FOR VEHICLES

Léon Dubois, Paris, France

Application August 28, 1939, Serial No. 292,367
In Luxemburg September 9, 1938

3 Claims. (Cl. 94—13)

The present invention relates to systems for constituting a rolling track for vehicles, for instance a track permitting the taking off of airplanes, in soft, muddy, or, generally speaking, bad ground, that is to say ground which does not permit a good rolling of vehicles thereon unless it is reinforced by means of devices such as above referred to.

The object of the present invention is to provide a system of this kind which is better adapted to meet the requirements of practice and, in particular, which is stronger and easier to employ than the systems used for the same purpose up to the present time.

An essential feature of the present invention consists, for constituting systems of the type above referred to, in making use of a plurality of rigid elements, preferably of triangular outline, which are juxtaposed to one another and are adapted to coact together in such manner as to constitute a kind of articulated continuous surface capable of fitting on the ground and rendering it more regular.

According to another feature of the present invention, the juxtaposed elements above mentioned are arranged in such manner that they coact with one another through interlocking connecting means capable of ensuring the transmission of vertical stresses from one element to the adjacent elements that surround it.

Other features of the present invention will result from the following detailed description of some specific embodiments thereof.

Preferred embodiments of the present invention will be hereinafter described with reference to the accompanying drawings, given merely by way of example, and in which:

Fig. 3 is a sectional view on the line III—III of Fig. 2;

Fig. 4 is a sectional view on the line IV—IV of Fig. 2;

Fig. 5 is a sectional view on the line V—V of Fig. 2;

Fig. 6 is a sectional view on the line VI—VI of Fig. 2;

Fig. 7 is a sectional view on the line VII—VII of Fig. 2.

Figure 1:
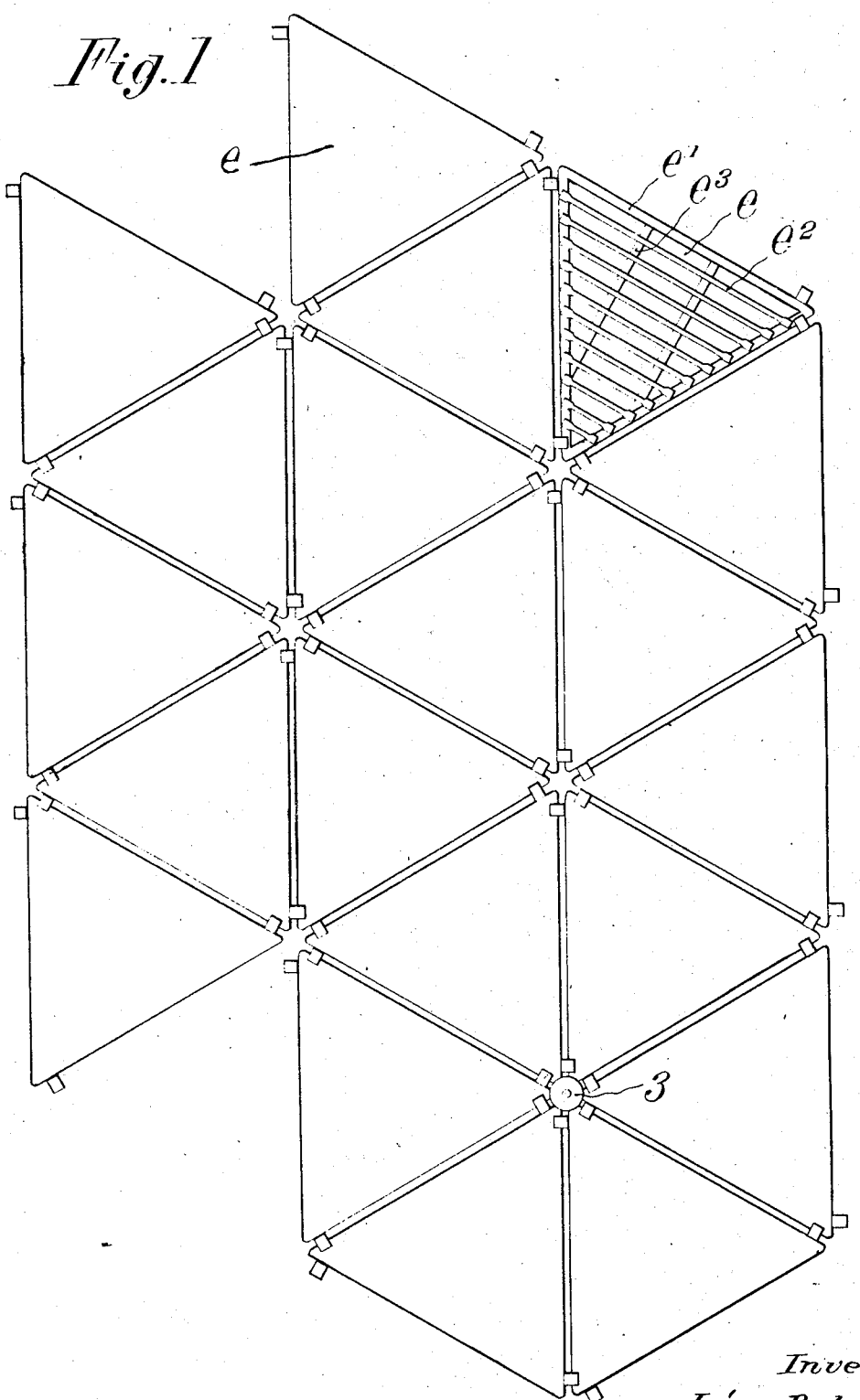
Fig. 1 is a general view of the system according to the present invention, for adapting soft ground.
Figure 2:
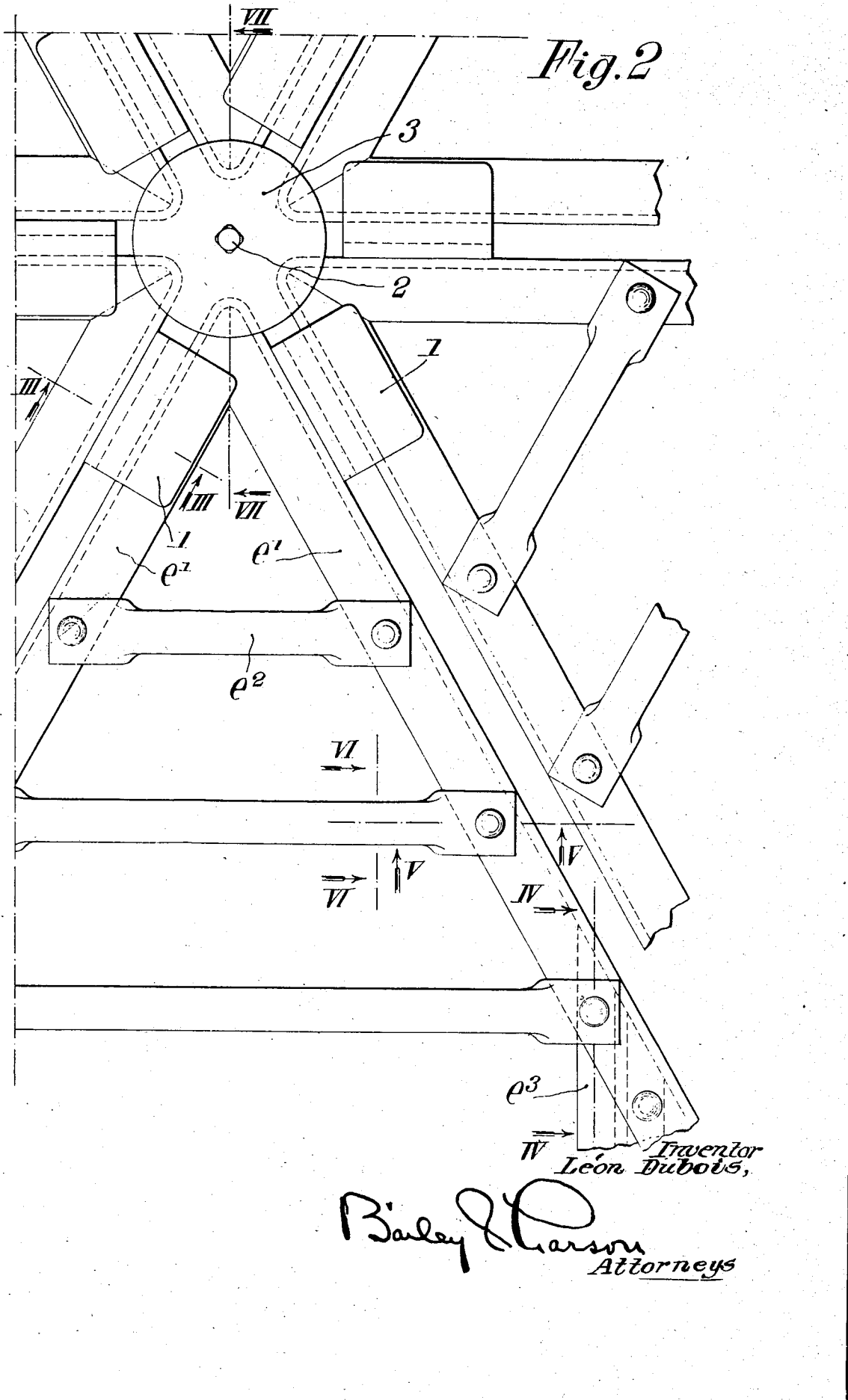
Fig. 2 shows, on an enlarged scale and with parts cut away, a detail of the system illustrated by Fig. 1.

In the following description, it will be supposed that the invention is applied to the case in which a soft ground is to be adapted to be used as a track for the take-off of heavily loaded airplanes or the like.

According to an essential feature of the present invention, this result is obtained by making use of a system including a plurality of rigid elements which are arranged in juxtaposition and arranged to coact with one another in such manner as to constitute a kind of continuous articulated surface or structure adapted to be applied on the ground to be treated so as to make it more even.

Advantageously, according to the present invention, each of the rigid elements above mentioned is constituted by a kind of metallic grid $e$, which is preferably given a triangular shape, whereby it is very rigid. Such a grid-shaped element may be obtained, for instance, by molding or by stamping, or again it may be constituted by the assembly of metallic sections of a usual type.

For instance, according to the particular embodiment illustrated by the drawings, each grid $e$ may consist of a frame $e^1$ in the form of an equilateral triangle of L-shaped section, reinforced by cross-members $e^2$, of substantially semi-circular section, riveted at their ends to irons $e^1$, two rods $e^3$, made for instance of T-shaped sectional irons, being arranged at right angles to said cross-members $e^2$.

It should be noted that it will be advantageous, as a rule, to make grids $e$ of relatively small size (for instance a height averaging one meter) so that they are easier to handle.

It would be possible to connect these various grids in a positive manner, for instance by means of articulation pins or bolts, still permitting certain relative movements of said grids with respect to one another. But it seems more advantageous, according to a particular feature of the invention, adapted to be used independently of the above mentioned one (that is to say in particular when the elements above mentioned are not rigid), to connect the adjacent grids to one another through interfitting connection devices such that they permit the transmission of the vertical stresses from one grid to the adjoining grids.

The operations of adaptation of the respective grids will thus be made much easier while avoiding the utilization of metallic pieces (such for instance as bolts) which are liable to get lost or work in a defective manner when they are rusted.

Furthermore, according to still another feature of the present invention, it will be advantageous to provide, on each of the sides of frame $e^1$, a male element and a female element, whereby each grid can instantaneously be engaged against an adjacent grid along any of its sides.

It is of course possible to provide a system complying with the above stated conditions in many different ways, but it has been found to be particularly advantageous to have recourse, for this purpose, to the particular embodiment illustrated by the appended drawings.

According to this embodiment, there is secured, on each side of frame $e^1$, a U-shaped piece $l$, the wings, or branches of which are disposed parallelly to the plane of the grid, at a distance from each other greater than the height of frame elements $e^1$. This piece $l$ constitutes the female connection element above mentioned.

With such an arrangement, the male element of the system is constituted, for instance, by the very side of the triangular frame, whereby each side of the grid is engaged, with a certain play, in the piece $l$ carried by a side of the adjacent element.

It should be noted that the wings of each piece $l$ must be made sufficiently long so that, account being taken of the play existing between the male and female elements of the connection devices, the grids cannot become unconnected from one another under the effect of deformations of the ground.

The existence of this play will make it possible, for any two adjacent grids, to have certain relative angular displacements with respect to each other about their line of assembly and therefore to conform to the shape of the ground surface on which they are disposed. The vertical stresses will then be transmitted from one grid to another through the medium of frame $e^1$ and connection pieces $e^1$, and the horizontal stresses will be absorbed by the ground itself, which opposes any sliding of the grids due to the fact that said grids are partly driven into the soft ground on which they are placed.

Finally, it may be advantageous, according to the present invention, to cut off or round off the angles of the grids $e$, whereby there is thus left, around the center toward which converge the sides of several adjacent grids, a free space into which can eventually be engaged a spike or the like 2, adapted to ensure, for instance through the intermediate of a disc 3 provided with a central hole, the anchoring of said elements on a part such as a piece of wood 4, driven into the ground for this purpose.

Whatever be the particular embodiment that is chosen, the invention provides a system for adapting a soft ground to be used as a running track for heavy vehicles. Among the advantages of such a system, the following may be cited as being particularly important:

a. The system is easy to employ, owing to the relatively light weight of grids $e$ and to their facility of assembly.

b. The system is particularly strong in view of its weight.

c. No special upkeep is necessary for such a system.

Of course, the grid elements may be made of any special light metal, and even of any suitable non metallic material, such, for instance, as reinforced concrete.

On the other hand, the grids may be adapted to coact with one another through the medium of interfitting connection devices of a type different from that above described, for instance a device including cooperating pins and eyes, respectively carried by the sides of adjoining grids. The only condition to be complied with is that there must be provided a suitable ratio of the length of engagement of the cooperating parts and of the play left between said male and female parts of the device whereby two adjoining grids can react on each other, under the effect of deformations of the ground, without any risk of being disengaged from each other.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A portable ground covering surface which when assembled constitutes a track for airplanes, land vehicles or the like which comprises in combination, a plurality of flat rigid elements of polygonal outline and adapted to be juxtaposed to one another so as continuously to cover the surface of the ground, and means carried by said flat elements for interconnecting them with a certain play, so as to constitute an articulated composite structure conforming to the shape of the surface of the ground on which it is placed, said means comprising channel shaped members secured to the edges of said elements and extending outwardly in the plane of said elements, the legs of the channel shaped members when the elements are juxtaposed extending over and under an edge of a juxtaposed element.

2. A portable ground covering surface which when assembled constitutes a track for airplanes, land vehicles or the like which comprises in combination, a plurality of flat rigid elements of polygonal outline adapted to be juxtaposed to one another so as continuously to cover the surface of the ground, means carried by said flat elements for interconnecting them with a certain play so as to constitute an articulated composite structure conforming to the shape of the surface of the ground on which it is placed, said means comprising channel shaped members secured to the edges of said elements and extending outwardly in the plane of said elements, the legs of the channel shaped members when the elements are juxtaposed extending over and under an edge of a juxtaposed element, at least some of the apexes of said polygonal elements being cut off so that the portion of the ground toward which converge the sides of the polygonal elements leading to the apexes is left uncovered, and a flat disc adapted to be anchored in the ground outside of said uncovered space and overlapping the adjoining apexes for fixing the corresponding elements with respect to the ground.

3. A portable ground covering surface which when assembled constitutes a track for airplanes, land vehicles or the like which comprises in combination, a plurality of flat rigid elements the outline of each of which is an equilateral triangle, whereby said elements can be juxtaposed to one another so as continuously to cover the surface of the ground, and cooperating male and female parts rigid with said elements and having their corresponding parts extending in the direction of the surface of said elements for interconnecting each element to the next one by mere engagement of said parts respectively in a direction parallel to the plane of the elements with a certain play so as to constitute an articulated composite structure conforming to the shape of the surface of the ground on which it is placed, said male parts consisting of U-shaped elements having their branches parallel to the plane of the elements by which they are covered, said female parts consisting of the sides of the elements themselves.

LÉON DUBOIS.